United States Patent [19]

Miller

[11] Patent Number: 5,238,493
[45] Date of Patent: Aug. 24, 1993

[54] COATING AND BREADING APPARATUS

[75] Inventor: Michael E. Miller, Bellevue, Ohio

[73] Assignee: Stein, Inc., Sandusky, Ohio

[21] Appl. No.: 735,783

[22] Filed: Jul. 25, 1991

[51] Int. Cl.$^5$ .................... B05C 5/00; A23P 1/08
[52] U.S. Cl. ........................ 118/16; 118/13;
 118/308; 118/312; 99/494
[58] Field of Search .............. 118/13, 16, 24, 308,
 118/312; 99/494

[56] References Cited

U.S. PATENT DOCUMENTS

| | | | |
|---|---|---|---|
| 2,092,836 | 9/1937 | Engels et al. | 118/24 |
| 2,119,910 | 6/1938 | Ferry | 118/24 |
| 2,300,396 | 11/1942 | Bookids | 118/18 |
| 2,347,164 | 4/1944 | Petrilli | 118/24 |
| 2,878,776 | 3/1959 | Vogel | 118/24 |
| 3,647,189 | 3/1972 | Johnson | 118/24 |
| 3,885,519 | 5/1975 | Orlowski | 118/24 |

FOREIGN PATENT DOCUMENTS

| | | | |
|---|---|---|---|
| 228744 | 12/1910 | Fed. Rep. of Germany | 118/13 |
| 3228614 | 2/1984 | Fed. Rep. of Germany | 99/494 |

Primary Examiner—W. Gary Jones
Assistant Examiner—Todd J. Burns
Attorney, Agent, or Firm—Oldham, Oldham & Wilson Co.

[57] ABSTRACT

This invention provides a cost effective, simple and sanitary breading machine suitable for coating a variety of food products, such as poultry, with different types of breading materials. After coating of upper and lower surfaces of food products introduced into the breading machine, a significant dwell time within the breading machine is achieved in the construction to allow breading material to more effectively set up on the coated food products. The coating machine further includes structure to enable the food products introduced therein to be flipped a plurality of times, wherein additional coating material is continuously applied to alternate sides of the food products and desirable coating characteristics are achieved. The coating machine and process for coating food products as set forth herein provide a food processor with a means to more effectively and efficiently coat large volumes of food products with breading material without sacrificing desirable characteristics which yield a high quality and more appealing breaded food product.

9 Claims, 4 Drawing Sheets

COATING AND BREADING APPARATUS

BACKGROUND OF THE INVENTION

This invention generally relates to a coating machine and process for selectively dispensing a breading or other coating material onto food products, to thoroughly and adequately coat the food products therewith. More particularly, the invention is directed to a coating machine and process of coating food products with a material, wherein the machine is adapted to enable a coating material to be more effectively dispensed onto and set-up on the food product by flipping the food product over and allowing additional coating material to be applied thereto and lengthening the dwell time in which the food product is disposed in coating material within the machine.

In the field of large scale production of prepared foods, a large variety of various food products are machine coated with batter and breading or the like before being fried or cooked and packaged for purchase by a consumer. The coating materials used to coat such food products may be breading comprising dry farinaceous materials which may take many forms, but will normally include grain flour in some form. The breading material may also include seasonings, spices, shortening, etc., to form a coating which adds flavor and texture to the product. Other coating material such as ground cereal, dried vegetables or the like may be used as desired. Most breading materials may be roughly classified by their appearance into one of three classes, including flour breading, free flowing breading, or Japanese-style crumbs. Each of these various breading materials have their own peculiarities which may affect the design of a machine adapted to apply the breading material to food pieces. As an example, flour breading, which consists of finely ground dust-like particles, may have a tendency to pack under pressure, thereby increasing the chance that flow of the breading material within a coating machine will become inhibited due to congestion or packing of the breading material. Additionally, with a flour breading, a problem may exist with adequately distributing the breading material within the breading machine to achieve the desired coating characteristics uniformly for all food products introduced into the machine.

Similarly, the breadings classified as free flowing usually comprise reasonably hard and roughly spherical particles ranging in size from dust to about 3/32 on an inch in diameter and may be crackermeal or the like. A problem may exist with adequately distributing free flowing breading material within the coating machine while preventing leakage of the breading material from the coating machine. The Japanese style crumbs consist of a modified wheat flour with small percentages of yeast, salt, sugar, vegetable oil and other additives. The Japanese style crumbs appear to be dried shredded white bread having particle sizes as large as ½ inch or as little as flour size particles with a distribution of sizes therebetween. The Japanese-style crumbs contain no uniform shape and are very delicate such that the coating machine must be able to properly handle this type of breading material to avoid degradation of the quality and particle sizes thereof.

It should be recognized that the coating machine can either be constructed to handle an individual type of breading material or must be adaptable to accommodate different breading materials with different physical characteristics. In large scale food production, the coating machine must be able to handle large volumes of food pieces while effectively coating food products passing therethrough. A prior art breading machine shown in U.S. Pat. No. 4,333,415 is uniquely adapted to handle Japanese-style crumbs, and insures that both bottom and top product coating layers of breading are supplied in the proper combination of coarse and fine crumbs to uniformly coat the surfaces of food products passing through the machine. In another prior art breading machine as shown in U.S. Pat. No. 4,128,160, there is shown a construction which is especially advantageously utilized with free flowing breading material. This breading machine forms a bottom layer of breading on a moving product belt on which a battered food product to be breaded is placed. The moving belt carries the food product under a falling curtain of breading to cover the top and sides thereof, wherein a vertical screw is utilized to convey breading material to an upper hopper for proper distribution onto the tops of food products passing therebelow on the product conveyor belt. It was found in this breading machine that the use of flour breading materials was inhibited due to congestion or packing of such materials within the machine, thereby inhibiting its effective use for high volume production.

Various prior art breading machines have been proposed which are especially useful for flour breading, such as found in U.S. Pat. No. 3,647,189. In this patent, a vertical screw housing is placed at an acute angle with respect to the horizontal plane for feeding breading material to a hopper structure to generate a falling curtain of breading material to coat the upper surfaces of food products. In use with a flour type breading as the coating material, any excess breading is removed by flipping over the coated food products rather than blowing off or otherwise removing excess breading due to the possibility of generating large amounts of flour dust. The structure to facilitate the flipping over of food products is particularly shown in U.S. Pat. No. 3,860,105 which is a division of the previously identified patent. In another prior art breading machine as shown in U.S. Pat. No. 4,496,084, the construction allows flour type breading material as well as free flowing breading to be advantageously used in the machine, and includes a breading circulation system which uniformly dispenses these types of breading material on both bottom and top surfaces of food products. A hopper structure supplied with breading material from a vertical screw supplies a falling curtain of breading material to effectively coat the top surface of food products within the machine. A cross feed screw was utilized to carry excess breading material to the vertical screw for circulation to the hopper, but it was found that there was a tendency for breading material to bridge and cause congestion at the location between cross feed and vertical screws.

More recently, in pending U.S. Pat. application Ser. No. 391,477, various improvements have been made to facilitate proper and efficient coating of food products using flour type breading, free-flowing breading or Japanese-style breading material. Although the last mentioned breading machines facilitate the use of various types of breading materials, various deficiencies have been found with respect to their operation with one or the other of the particular type breading materials. For example, a problem has been found in that a coating machine used to coat large volumes of food products may utilize a material which does readily absorb into a battered food product, such as flour, which can result in non-uniform coating of the food products. Also it has been found that there may be a tendency for the coating to be easily dislodged from the coated food product within the coating machine or after the coating process. Additionally, in the large scale production of coated food products wherein large volumes of food product are introduced into the coating machine, the desired coating characteristics may be sacrificed for speed of production.

SUMMARY OF THE INVENTION

Based upon the foregoing, there has been found a need to provide a coating machine which can adequately handle various types of breading materials, particularly flour type breading and free flowing breading, wherein uniform and desired coating characteristics are achieved effectively and efficiently. It is therefore a main object of the invention to provide a coating machine which can be utilized with various types of coating materials and a process of coating food products which will more effectively coat food products while avoiding disadvantages found in the prior art.

It is another object of the invention to provide a coating machine which will insure that a coating material is applied to and firmly set up on food products introduced into the coating machine, to avoid degradation of coating characteristics either within the coating machine or subsequent to the coating operation.

Yet another object of the invention is to provide a coating machine and method of coating which will provide desirable features such as uniform coating of large volumes of food products, to provide thicker coatings of breading materials on the food product as well as to provide the coated food product with a desired texture after coating thereof.

These and other objects of the invention are achieved by a cost effective, simple and sanitary breading machine suitable for coating a variety of food products, such as poultry, with different types of breading materials. After coating of upper and lower surfaces of food products introduced into the breading machine, a significant dwell time within the breading machine is achieved in the construction to allow breading material to more effectively set up on the coated food products. The coating machine further includes structure to enable the food products introduced therein to be flipped a plurality of times, wherein additional coating material is continuously applied to alternate sides of the food products and desirable coating characteristics are achieved. The coating machine and process for coating food products as set forth herein provide a food processor with a means to more effectively and efficiently coat large volumes of food products with breading material without sacrificing desirable characteristics which yield a high quality and more appealing breaded food product.

BRIEF DESCRIPTION OF THE DRAWINGS

Additional objects and advantages of the apparatus and process of the present invention will become apparent to one skilled in the art upon reference to the following detailed description in association with the accompanying drawings, wherein.

DETAILED DESCRIPTION OF THE INVENTION

Figure 1:
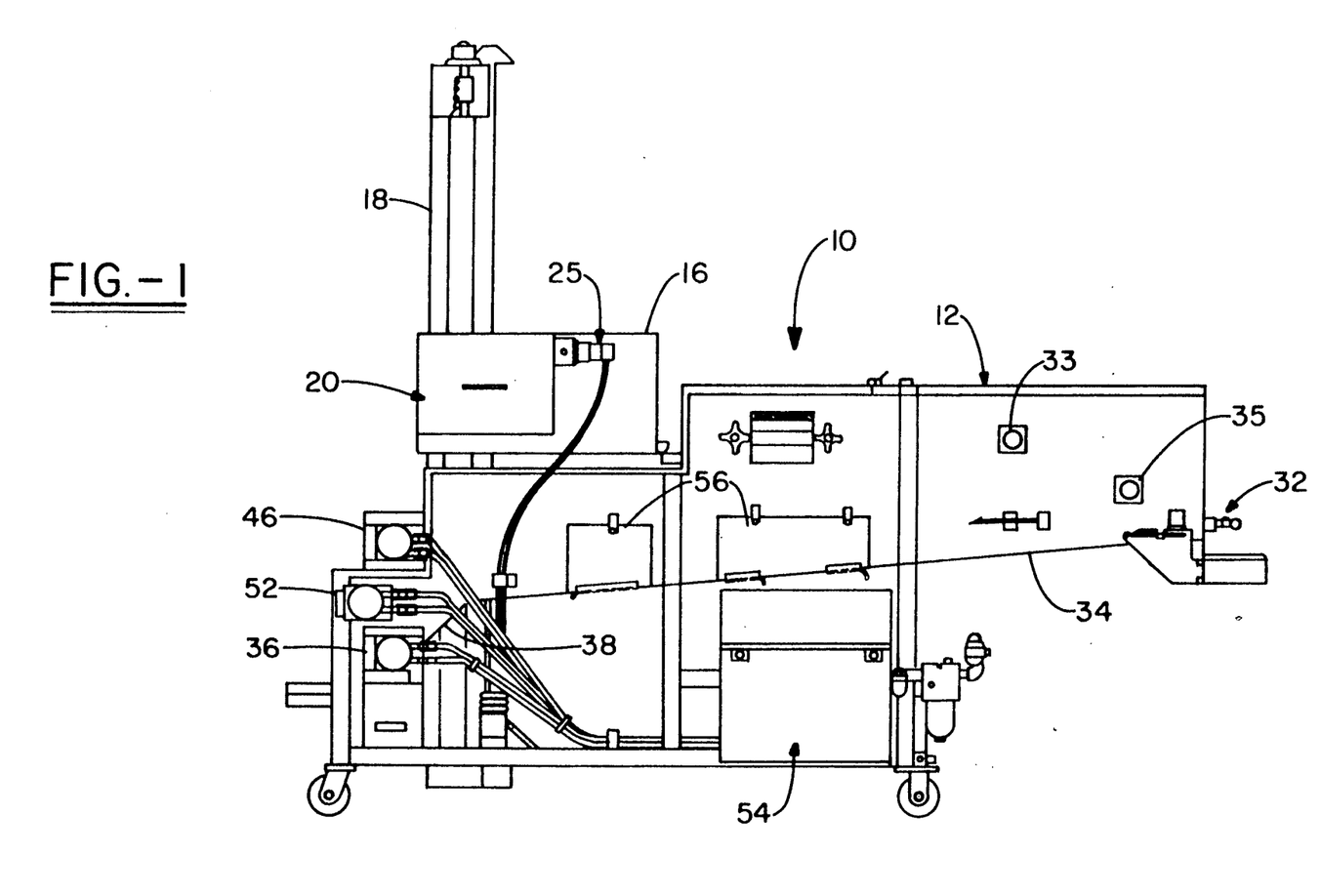
FIG. 1 is a side elevational view of the coating machine of the present invention.
Figure 2:
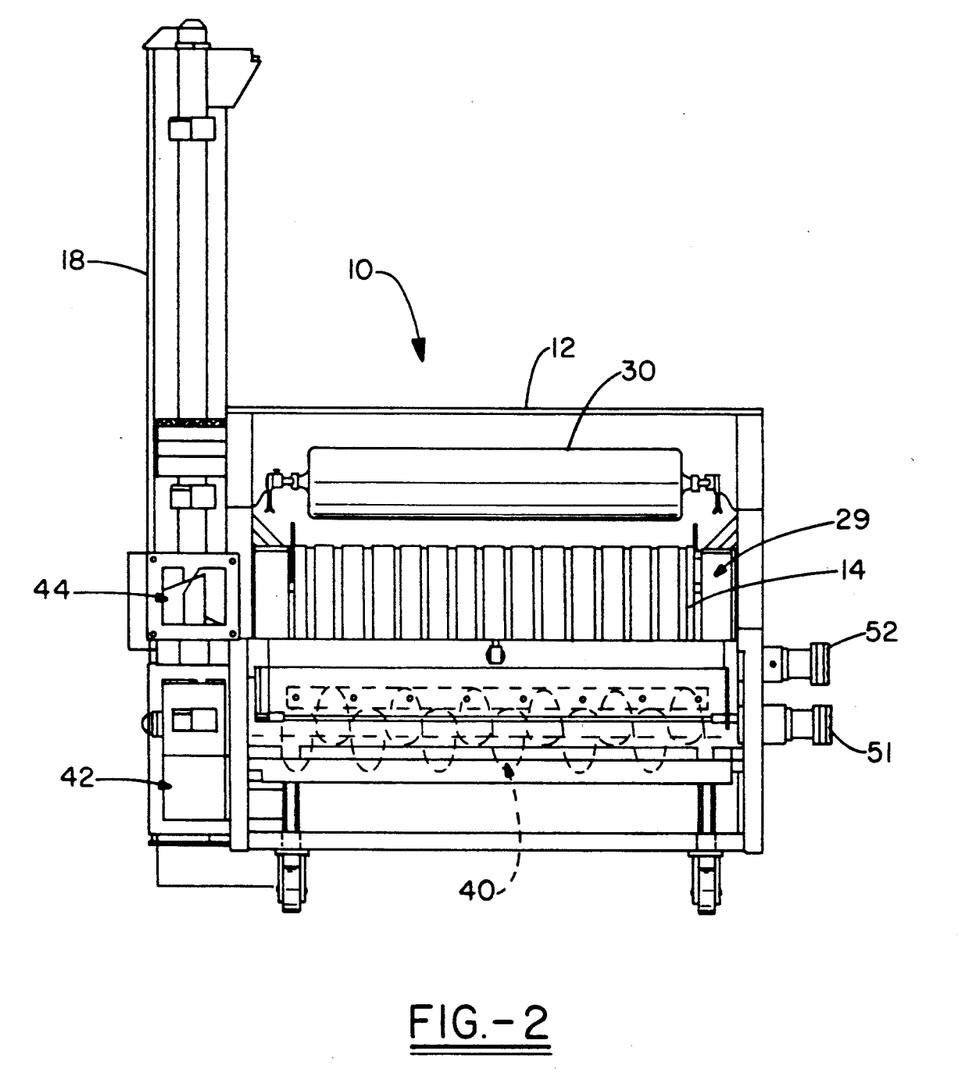
FIG. 2 is an elevational view of the infeed end of the coating machine of FIG. 1.
Figure 3:
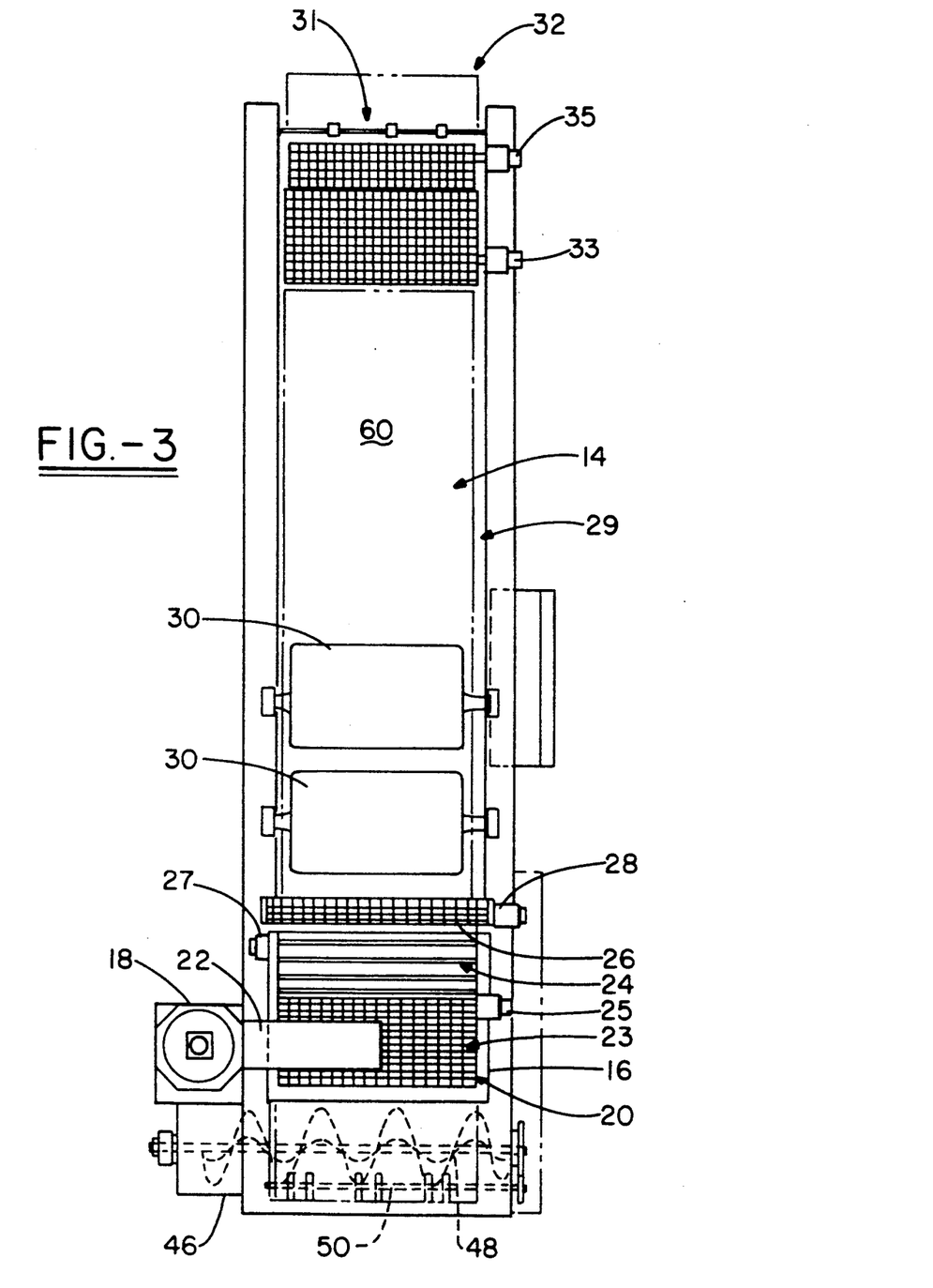
FIG. 3 is a top plan view of the breading machine of FIG. 1, with the dust covers removed for clarity of description.

Turning now to FIGS. 1-3, the coating machine of the invention will be described in more detail. The coating machine 10 comprises an elongated frame enclosure 12 which supports a main product conveyor belt 14. The conveyor belt 14 is provided with a layer of coating or breading material thereon as will be hereinafter described, such that a bottom surface of food products placed on belt 14 will be coated therewith. An in-feed conveyor (not shown) or batter machine will convey either battered or unbattered food product into machine 10, to be placed on product belt 14 having the bottom layer of breading material placed thereon. The coating machine 10 also includes a hopper 16, which has been removed from FIG. 2 for clarity. The hopper 16 is adapted to be supplied with an amount of a coating or breading material by means of a vertical screw assembly 18 which will discharge breading material from its top end by means of a chute 22 for distribution to hopper 16. The hopper 16 includes a crumb box and sifter assembly 20 having a conveyor belt 23 driven by motor 25, wherein the belt 23 is adapted to evenly distribute breading material in the hopper 16. The hopper 16 also includes a conveying system 24 which is driven by motor 27 to convey breading material introduced into hopper 16 towards a discharge or hopper gate area 26. The hopper gate area 26 is an adjustable opening which will allow a desired amount of breading material to be withdrawn from hopper 16. For a flour coating material, the amount of flour from hopper 16 is disposed on a sprinkle conveyor 28 having a motor for driving thereof. This sprinkle conveyor 28 acts to distribute the flour breading material evenly and uniformly onto product conveyor belt 14 as a cloud of flour which will coat the top and side surfaces of the food products disposed on product conveyor belt 14. For other types of coating materials, the sprinkle belt 28 may not be needed, and breading will fall through the hopper gate area 26 as a curtain.

In the preferred embodiment, the product conveyor belt 14 is a pervious endless belt which forms an upper belt run 60 traveling on an upper pan 31 which supports upper belt run 60 over a significant portion of its length. The upwardly angled pan 31 allows the conveyor belt 14 to carry the bottom layer of breading material along with it as it travels along pan 31, such that food products placed on conveyor belt 14 will be set in the bottom layer of breading material over a substantial portion of the upper conveyor belt run 60 and for a significant dwell time. Additionally, any excess breading material will be carried along with conveyor belt 14 along the upper pan 31 for redistribution into the breading cycle of the apparatus. The upper pan 31 and upper belt run 60 of the product conveyor belt 14 have significant lengths, such that after food products introduced into the machine 10 have been coated on their bottom and top surfaces, a significant dwell time is achieved to allow breading material to set up on the food product and to achieve significantly improved coating characteristics. Additionally, the product belt 14 will carry an amount of excess coating material along therewith to achieve distinct advantages as will be hereinafter described.

The coated food product will be conveyed on product conveyor 14 to a plurality of pressure rolls 30, which will apply a slight pressure to food products to facilitate retention of the coating of breading material thereon. After passing through the pressure rolls 30, the coated food products are further conveyed on main product belt 14 towards the exit or outlet end 32 of machine 10. At the outlet end 32 of machine 10, there are provided a plurality of additional conveyor runs 15 which will be described in more detail hereinafter. The plurality of additional conveyor runs are spaced relative to main product belt 14 to allow food products to be flipped a number of times and to increase the dwell time in which the food products will be disposed in a continuous bottom layer of coating material. The additional conveyor runs may be driven by means of motors 33 and 35. The endless main product belt 14 also has a bottom conveyor run which is adapted to return along a bottom pan portion 34 of frame enclosure 12 so as to drag along the bottom sloping surface of pan 34. As will be described hereinafter, an amount of excess coating material will fall onto bottom pan portion 34 and the bottom conveyor run of the belt 14 will act to convey excess coating or breading material down the sloping surface of pan 34. In this way, excess coating material is directed towards a cross feed screw housing 36 in which the excess breading material will drop into from bottom pan 34 along sloping surface 38. The cross-feed housing 36 contains a cross-feed screw 40 which acts to convey breading material from cross feed housing 36 to a transition zone 42 which in turn will distribute breading material to the vertical screw housing 18. The vertical screw 19 will convey the breading material upwardly wherein a portion thereof will be circulated into hopper 16 for continuation of the breading cycle within the coating machine 10. To create the bottom layer of coating material, the vertical screw housing 18 has an opening 44 therein through which an amount of breading material is discharged into a spreader screw housing 46. The spreader screw housing supports a spreader screw 48 therein which is adapted to convey the breading material horizontally within housing 46. The spreader screw housing includes an adjustable aperture formed along the bottom thereof such that as breading material is conveyed within spreader screw housing 46, an amount of breading material will fall therefrom to form a layer of the breading material across the width of the main product conveyor belt 14. This layer of breading material forms the bottom coating layer for food products to be positioned on product conveyor belt 14 as desired. Any excess breading material remaining within the spreader screw housing 46 is discharged therefrom through a relief hole in the cross feed screw housing 36 so as to be recirculated in the breading machine 10.

Some of the particular aspects of the coating material circulation system in coating machine 10 are substantially similar to that described in U.S. Pat. application Ser. No. 391,477 filed Aug. 9, 1989 and assigned to the assignee of the present invention. Details of the structure of the circulation system including vertical screw 19, cross-feed screw 40, and spreader screw 48 may be referred to in the above-identified application which is hereby incorporated by reference. For example, vertical screw 19 may be provided with double flighted auger blades at the location of discharge chute or transition zone 42 from the cross-feed screw housing 36 to more efficiently and more quickly move coating material from this area to avoid packing and congestion thereof. Although the vertical screw 19 and housing 18 perform a similar function to convey coating material to form the bottom and top layers of coating material, the vertical screw housing 18 has been modified slightly to achieve improved results. Particularly, at a bottom portion of the vertical screw housing 18 at the location of the infeed transition zone 42, the vertical housing as described in U.S. application Ser. No. 391,477 included a ledge or channel formed in a side portion thereof which required a continuous weld in its manufacture. The vertical screw housing 18 has been modified to eliminate any ledge or channel formed in a side wall thereof at the location of the infeed transition zone. By eliminating the ledge or channel in this manner, manufacture of the vertical screw housing 18 has been simplified as no continuous weld is needed in its manufacture, and it has also been found that has achieved an improvement of up to 2-3% less breakdown or degradation of the coating or breading material within machine 10. This is especially apparent when using a breading material such as Japanese-style crumb material. It is also noted that the spreader screw 40 may be provided with double flighted auger blades at the location of opening 44 at the discharge chute thereof so as to more quickly move the coating material in this area and obtain uniform spreading onto the product conveyor belt 14. The cross-feed screw 40 may be driven by a separate motor 51 or may be coupled to the main drive shaft of the product conveyor belt shown at 50 which is driven by a motor 52.

After an amount of breading material is supplied to spreader screw housing 46 and the spreader screw 48, the remaining amount of breading material is conveyed upwardly by the vertical screw 19 within vertical screw housing 18 to be disposed into discharge chute 22 as previously described. From the vertical screw housing 18, the breading material may be conveyed back into hopper 16 by means of sifter assembly 20 which includes a sifter belt driven by motor 21, and may include a vibration means as well as a sifter crumb box to provide uniform distribution of the recirculated breading material into hopper 16. The breading material is then conveyed to the sprinkle belt 28 to form the top layer of breading material as previously described. Again, the details of the hopper 16 and associated structure may be referred to in U.S. Pat. application Ser. No. 391,477 which has been incorporated herein by reference.

It is also noted that the breading machine 10 includes a control box 54 to control the speed of operation of the various hydraulic motors associated with breading machine 10 so as to control the speed at which product conveyor belt 14 moves, the speed of the cross feed screw 40, or a spreader screw 48, as well as the conveying systems associated with hopper assembly 16. Although hydraulic motors are preferred for variable speed control and maintenance purposes, other types of motors such as electrical may be utilized. Additionally, a variety of access doors 56 are provided on breading machine 10 to allow these to effectively clean and maintain coating machine 10 in good operating condition.

A unique aspect of the coating machine 10 of the present invention is found in the handling of coated food products at or near the discharge end 32 of machine 10. It has been found that problems in properly coating food products introduced into the coating machine 10 may be due to the inadequate dwell time of a coated food product within the coating apparatus before it is discharged to the next step of production in the food preparation process. In this way, a battered and coated food product will many times not have a sufficient thickness of coating material thereon, and may have a tendency to lose an amount of coating applied thereto or be stripped of an amount of coating after coming out of a coating machine into the next stage of food preparation. Additionally, various undesirable surface characteristics may be created if a coating material is not given sufficient time to set up and dry on a battered food product. These undesirable characteristics include conveyor belt marks formed on the coated food product, leaching of batter material through the coating so as to form what appears as uncoated portions on a food product or the like. It is therefore a main aspect of the coating machine 10 of the present invention to overcome these deficiencies and to provide various desirable coating characteristics by use of the machine 10. The desirable coating characteristics to be achieved by use of machine 10 include providing a thicker coating of a breading or coating material on food products introduced into the apparatus 10, wherein the coating is firmly set up on the food product to avoid the possibility that the coating material will dislodge from the product within the apparatus 10 or subsequent to the coating operation. Additionally, the coating machine 10 enables efficient and uniform coating of all food products introduced therein, with the resulting coating having a desired texture while inhibiting the formation of conveyor belt marks or the like on the coated food products.

These desirable coating characteristics are achieved by providing a significantly longer dwell time within coating machine 10, and providing a continuous bottom layer throughout the coating cycle of food products and primary as well as subsequent sprinkling of coating material onto both upper and lower surfaces of food products. These coating characteristics are achieved by a significantly lengthened upper conveyor belt run on which food products travel after being coated on their upper and lower surfaces with the coating material, and subsequently flipping the coated food products onto additional conveyor belt runs generally indicated at 33 in FIG. 3 on which are provided a continuous bottom layer of coating material, and onto which is sprinkled excess coating material during the coating cycle to achieve yet additional dwell time as well as further coating of food products within the machine 10.

Figure 4:
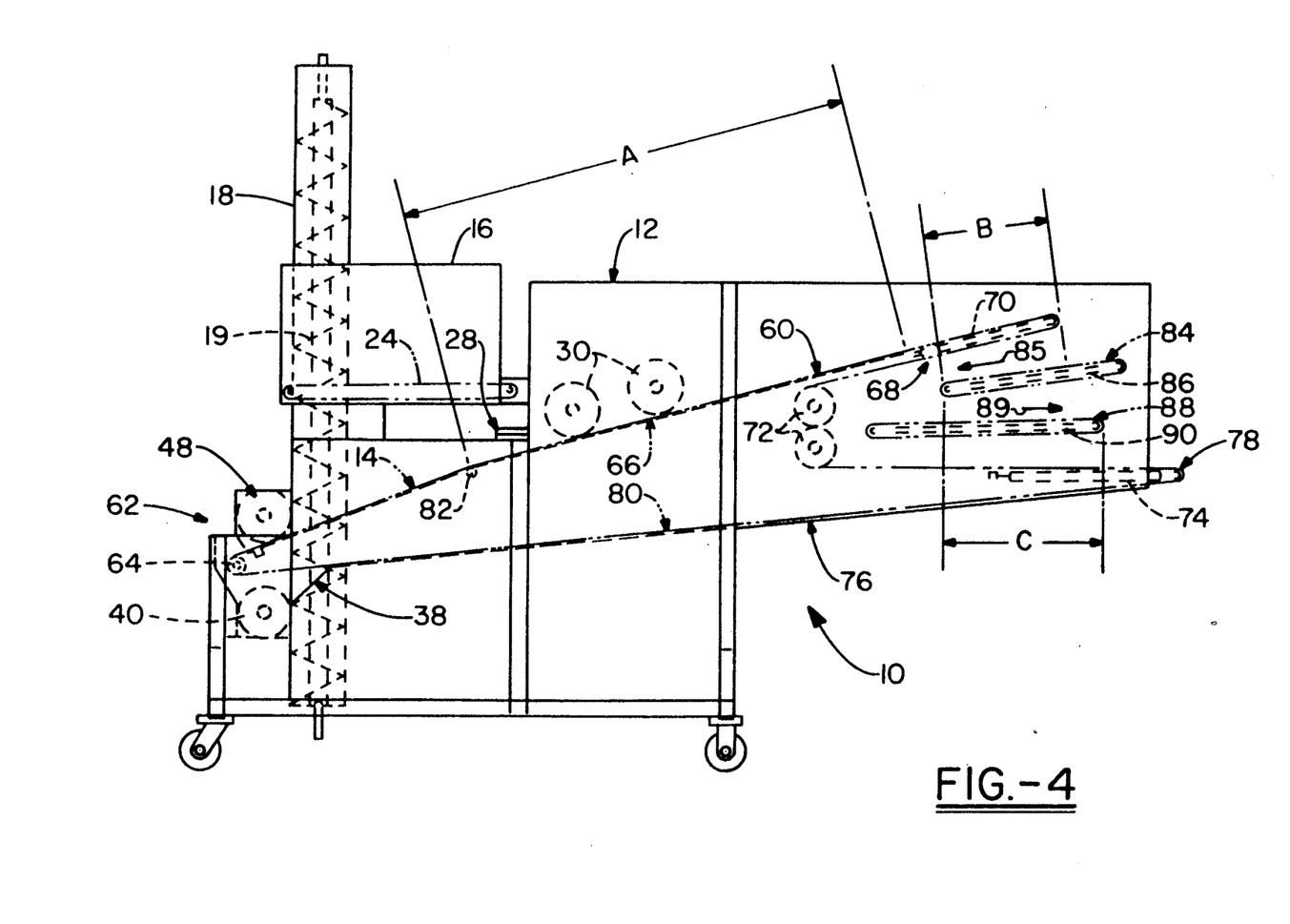
FIG. 4 is a generally schematic cross-sectional view taken along line 4—4 of FIG. 2 and showing more particularly the coating machine and process of coating food products with breading material.

Turning now to FIG. 4, the more particular configuration of the conveyor belt runs in the coating machine 10 are shown. In FIG. 4, the main conveyor belt 14 is shown to have an upper belt run 60 which is shown to extend from an infeed end 62 or the coating machine 10 and is driven by a drive sprocket 64 being coupled to a hydraulic motor 52 as previously described. Food products are introduced into coating machine 10 at a position adjacent in feed end 62 onto upper belt runs 60 after a bottom layer of coating material has been formed on the upper belt run 60 by means of the spreader screw 48 within spreader screw housing 46 as previously described. The upper belt run 60 travels on an upper pan 66 which extends the length of the upper belt run 60 to a position shown at 68, wherein a pervious conveyor support 70 is provided for the remainder of the length of upper belt run 60. The main conveyor belt 14 travels from belt support 70 to a pair of reversing rollers 72, and subsequently to a lower belt support member 74 lying adjacent the bottom pan portion 76 of frame enclosure 12. The portion of conveyor belt 14 traveling on belt support member 74 comprises the out feed end 78 of the coating machine 10, from which coated food product will exit to the next step in the food processing cycle, such as a cooking oven, freezing step, subsequent battering step or the like. After traveling around belt support member 74, the conveyor belt 14 forms a bottom conveyor belt run 80 which is adapted to travel along the downwardly inclined bottom pan portion 76 of the frame enclosure 12. Any excess coating material is adapted to be conveyed along bottom pan portion 76 by means of bottom conveyor run 80 to the downwardly inclined portion 38 of bottom pan 76 at the location of crossfeed screw 40 so as to be redistributed into a coating cycle within machine 10.

As seen in FIG. 4, the portion of upper conveyor belt run 60 adjacent infeed end 62 is inclined upwardly at a relatively steep angle until it reaches a transition shaft 82. Food products to be coated are introduced along this region of upper belt run 60 and onto a bottom layer of coating material to be coated therewith. Just past transition shaft 82, upper belt run 60 is inclined at a slightly shallower angle where food products will be coated on their top and side surfaces by means of the hopper 16 which will distribute coating material as a falling curtain or cloud over the entire width of belt 14 as previously described. The bottom and top layers of coating material formed on food products introduced into coating machine 10 is thereafter able to set up on food product along the portion of upper belt run 60 extending from transition shaft 82 to point 68 at which the upper pan portion 66 terminates. This distance of upper belt run 60 is indicated by dimension "A" which represents a first dwell time in which food product introduced into coating machine 10 will be positioned within an amount of coating material distributed onto and around the food product on upper belt run 60. As this entire region of upper belt run 60 is supported on upper pan portion 66, substantially no coating material is lost as food product continues to travel along this portion of its path.

The belt support member 70 extending beyond point 68 of upper belt run 60 comprises a pervious belt support, wherein excess breading material is allowed to fall away from the coated food product along this length of upper belt run 60. An additional conveyor run 84 supported by an impervious belt support or pan 86 is positioned directly beneath the pervious belt support 70 such that excess coating material falling from upper belt run 60 at the location of belt support 70 will fall thereon forming a continuous bottom layer of coating material on conveyor run 84. Food product conveyed along upper belt run 60 will be made to fall off conveyor belt 14 at the distal edge of belt support 70 and be flipped onto additional belt run 84 wherein the distance between belt 14 and belt 84 is such that any particular food product is flipped so that its bottom surface on belt run 60 will be the top surface on belt run 84. The belt run 84 is adapted to be driven in the direction of arrow 85 which is the opposite direction from that of upper belt run 60. It should be recognized that an amount of coating material will also be conveyed so as to sprinkle off of the end of the upper belt run 60 and onto belt run 84 wherein the food products which have been flipped onto belt run 84 will be sprinkled on their now top and side surfaces with an additional amount of coating material. Similarly, as the belt support 70 is pervious, additional coating material will also sprinkle onto food products traveling on belt run 84 in the region below belt support 70. By directing food products flipped onto conveyor belt 84 under a falling curtain of excess coating material falling from upper belt run 60, the food product will remain continuously in a bottom layer of coating material formed on belt run 84 and is also sprinkled with coating material from above to further and fully coat all regions of the food products. The additional belt run 84 thus provides an additional dwell time indicated by length "B" in which food products will be continuously positioned in a bottom layer of coated material so as to further dry and coat the food products. Yet another conveyor run 88 supported by an impervious belt support or pan 90 is positioned directly beneath belt run 84. Food products disposed onto belt run 84 will again by flipped onto the additional belt run 88, where again the distance between belt run 84 and belt run 88 will allow food product to be flipped such that its alternate surface will be facing upwardly. The belt run 88 is adapted to convey food product in the direction of arrow 89, wherein the flipped food products will be sprinkled from excess coating material falling from the left edge of belt run 84. Excess coating material from belt run 84 will also again form a continuous bottom layer of coating material on the belt run 88, such that the belt run 88 will provide an additional dwell time indicated by the distance "C" in which food product will be continuously positioned in a bottom layer of coated material. At the end of additional belt run 88, the food products positioned thereon will again by flipped onto the bottom portion of a main conveyor belt 14 traveling on conveyor support 74. Food product will then be conveyed to the outlet or discharge end 78 of machine 10 on conveyor belt 14. The conveyor support 74 is a pervious member which will allow excess breading material to fall onto bottom pan portion 76 of the housing 12 so as to be carried by the bottom belt run 80 along bottom pan 76 for recirculation in machine 10. A vibrator assembly (not shown) may be associated with the belt support 74 so as to shake any excess breading material onto the bottom pan 76 as desired. Additionally, the belt support 90 of additional conveyor run 88 may be provided as pervious along a portion thereof so as to further facilitate allowing excess breading material to fall onto bottom pan portion 76 for recirculation into a breading cycle.

The conveyance path for food product introduced into coating machine 10 as described with reference to FIG. 4 allows significantly more dwell time to be achieved along upper belt run 60 due to the upward inclination of the surface which acts to extend the conveyance path within machine 10. It has been found that with many coating materials, the materials do not readily absorb a batter in which food products may be are dipped before being introduced into machine 10. Upon initial coating of a battered food product with such coating materials, the coating will dry and absorb the batter, with some batter leaching out during this process. The significantly longer dwell time indicated by region A of machine 10 allows this process to occur such that upon reaching the end of upper belt run 60, coating material has absorbed the batter and set up on the food product to a greater degree. Subsequent to this, the food product is flipped onto the additional belt runs 84 and 88, wherein alternate sides of the food products are exposed to additional sprinkling of coating material from above. Any regions of the coated food product where batter has leached out will be again coated with an additional amount of material in these areas. Each of the additional belt runs 84 and 88 also provide more dwell time in which food products will be positioned in a continuous bottom layer of coating material and allowed to continue drying such that upon exiting the coating machine 10, the product will be dried to a degree which is significantly greater than that achievable in prior art apparatus.

As merely an example, a coating machine can in accordance with the invention may be constructed for coating of poultry products wherein the dwell distance indicated as "A" along upper belt run 60 may be 60 inches from the transition shaft 82 to the end of upper pan 66. The dwell distance "B" along additional belt run 84 may be approximately 16 inches, and the dwell distance "C" along additional belt run 88 may be approximately 21 inches, thereby giving a total dwell distance of approximately 100 inches within coating machine 10. This significantly increased dwell distance and time is achieved without compromising production capabilities of the coating machine 10, and provides the distinct advantages as described. The particular dwell time achieved in machine 10 will be dependent upon the speed at which the various conveyor belts are driven, but it should be understood that the dwell time in which food product will be continuously positioned in a bottom layer of coating material will be significantly lengthened. The coating process as achieved in the coating machine 10, allows a heavier and thicker coating of breading or other material to be formed on the food products while allowing the coating material to set up on the food products so as to minimize any chance that the coating material will dislodge from the coated food products during coating or subsequent to the coating operation. The coating machine 10 also provides a coated food product which has been dried to a significantly greater extent such that desired coating characteristics are achieved to provide a high quality, more appealing food product without sacrificing efficiency and cost effectiveness. Proper drying of a battered and coated food product within machine 10 will form a coated food product which will exhibit better crispness upon subsequent cooking thereof. The three flips achieved in coating machine 10 act to properly coat any leached batter regions on the food products and facilitate drying of the food product as desired. The coating process will thus eliminate or minimize conveyor belt marks on the coated food product, and has been found to provide extremely desirable surface characteristics during the coating process. For example, poultry products coated with a flour type breading material in coating machine 10 will have a desirable surface texture. The coating machine 10 has been found to be extremely advantageous for the use of flour type breading materials, but is also suitable for use with free flowing breading as well as possibly Japanese-style crumbs and other coating materials.

Although the invention has been described with reference to a particular preferred embodiment thereof, it should be recognized that various changes and modifications may be made without departing from the spirit and scope of the invention as defined in the appended claims.

What is claimed is:

1. A coating machine for selectively disbursing a coating material onto a food product passing therethrough, comprising
   a frame defining a product conveyance path and having a product input end and a product discharge end,
   a main conveyor means positioned within said frame having a discharge end,
   means for forming a substantially uniform bottom layer of coating material on said main conveyor means, said bottom layer of coating material being formed on said main conveyor means before said food product is positioned on said main conveyor means such that said food product will be disposed onto said bottom layer of coating material,
   hopper means disposed over said main conveyor means for providing a selected quantity of coating material which is disbursed onto the top and side surfaces of said food main conveyor means allowing a predetermined dwell time of said food product within said coating material;
   at least one additional conveyor means having a discharge end, said at least one additional conveyor path having a portion thereof positioned below said main conveyor means in overlapping relationship to accept said food product from said main conveyor means, wherein excess coating material from said main conveyor means will fall through said main conveyor means onto said at least one additional conveyor means at the location of said overlap, said at least one additional conveyor means including means for forming a continuous, substantially uniform bottom layer of coating material on said at least one additional conveyor means from said excess coating material falling thereon, such that said food product traveling on said main conveyor means will be transferred forms aid main conveyor means onto said at least one additional conveyor means and onto said continuous bottom layer of coating material formed on said at least one additional conveyance path such that the dwell time in which said food product is continuously positioned in a bottom layer of coating material is increased before said food product is discharged from said coating machine, and wherein said excess coating material falling from said main conveyor means will be sprinkled onto top and side surfaces of said food product which have been transferred to said at least one additional conveyor means.

2. The coating machine of claim 1, wherein,
   said main conveyor means is a previous conveyor belt supported on an impervious pan over a portion of its length such that coating material dispensed thereon will form said bottom layer of coating material and said conveyor belt will carry said coating material along therewith as it travels in said frame, and wherein the portion of said main conveyor means which overlaps said at least one additional conveyor means is not supported on said impervious pan such that said coating material carried along with said main conveyor will fall through said main conveyor to form said continuous bottom layer of coating material on said at least one additional conveyor means.

3. The coating machine of claim 1, wherein,
   said food product is transferred from said main conveyor path by flipping thereof onto said at least one additional conveyor means such that the alternate side of said food product will be disposed within said continuous bottom layer of coating material.

4. The coating machine of claim 1, wherein,
   said at least one additional conveyor means is a previous conveyor belt which is supported by an impervious pan over a portion of its length such that said excess coating material falling thereon will form said continuous bottom layer and said at least one additional conveyor belt will carry said coating material along therewith.

5. The coating machine of claim 1, wherein,
   said at least one additional conveyor means further comprises three additional conveyor means, each of which forms an additional conveyance path having a discharge end, wherein the first said additional conveyor means has a portion thereof positioned below said conveyor means in partially overlapping relationship with said main conveyor means, the second additional conveyor means is positioned below said discharge end of said first additional conveyor means in partially overlapping relationship to said first conveyor means, and the third additional conveyor means is positioned below the discharge end of said second conveyor means in partially overlapping relationship to said second conveyor means, such that food product traveling on each of said additional conveyor means will be transferred to the conveyor means positioned below.

6. The coating machine of claim 5, wherein,
   each of said additional conveyor means are provided as pervious conveyor belts which are supported by an impervious pan over a portion of their lengths such that excess coating material falling thereon will form said continuous bottom layer and, each of said conveyor belts will carry said coating material along therewith over a portion of its length.

7. The coating machine of claim 5, wherein,
   said food product is transferred from said first additional conveyor means to said second additional conveyor means and from said second additional conveyor means to said third additional conveyor means by flipping thereof such that the alternate side of said food product will be disposed within said continuous bottom layer of coating material.

8. The coating machine of claim 5, wherein,
   said main conveyor means and said three additional conveyor means work in conjunction with one another to provide a combined conveyance path in which food product will be disposed in a continuous bottom layer of coating material so as to increase the dwell time in which said food product is continuously positioned in a bottom layer of coating material.

9. The coating machine of claim 5, wherein,
   said first and second additional conveyor means are provided as pervious conveyor belts which are supported on an impervious pan over their length except for a portion thereof adjacent said discharge ends, wherein excess breading material on each of said first and second additional conveyor means will fall through onto the additional conveyor means positioned below such that the excess coating material will be sprinkled onto the top and side surfaces of said food product which have been transferred to the additional conveyor means positioned therebelow.

* * * * *